Aug. 16, 1932.  C. McL. MOSS  1,871,724
MULTIFREQUENCY CIRCUIT BREAKER CONTROL SYSTEM AND PROTECTIVE SYSTEM
Filed March 3, 1928  6 Sheets-Sheet 1

INVENTOR
Charles MacLean Moss
BY
.ATTORNEY.

Aug. 16, 1932.   C. McL. MOSS   1,871,724
MULTIFREQUENCY CIRCUIT BREAKER CONTROL SYSTEM AND PROTECTIVE SYSTEM
Filed March 3, 1928   6 Sheets-Sheet 3
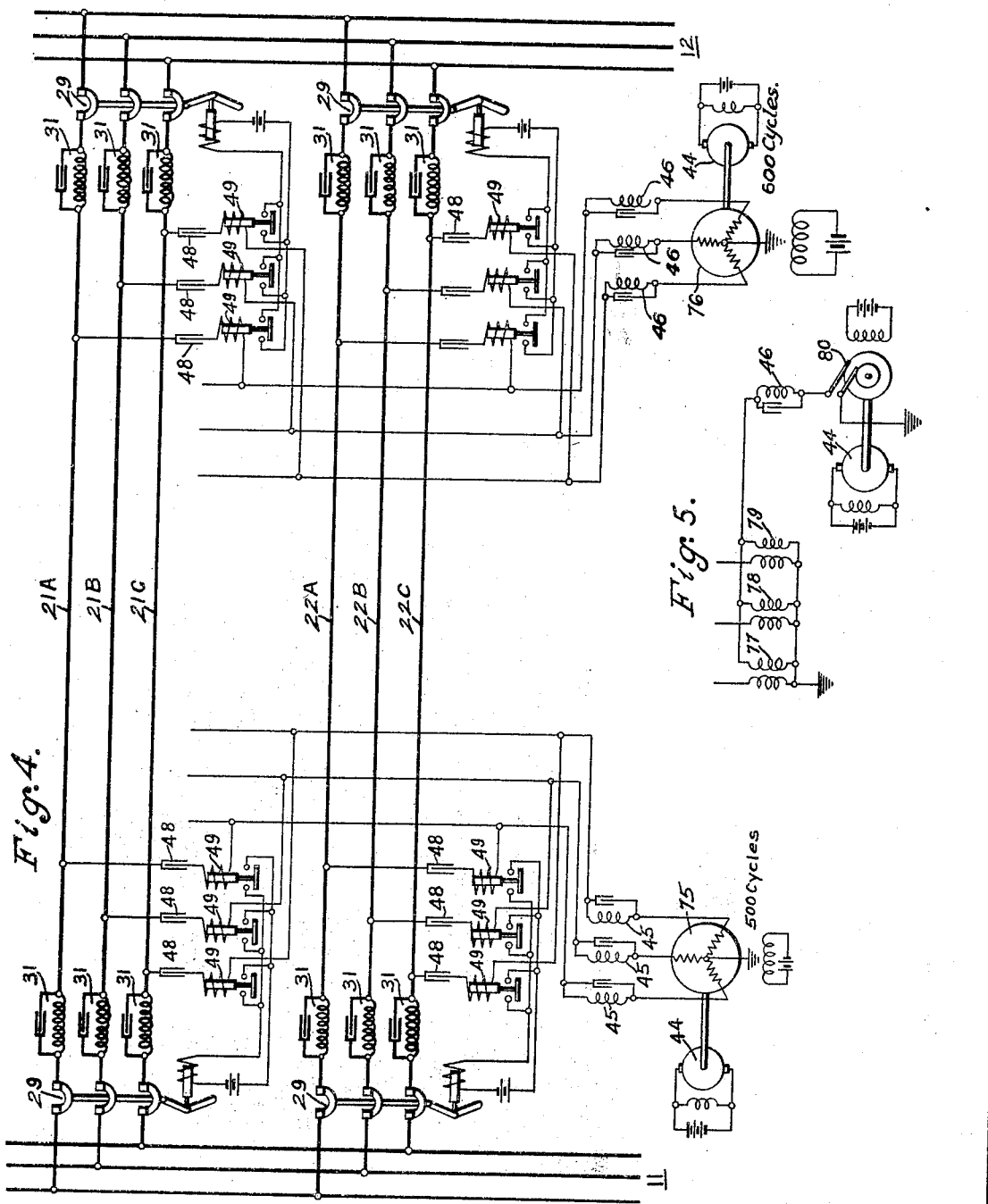
INVENTOR
Charles MacLean Moss
BY
Chesley S. Carr
ATTORNEY INVENTOR
Charles MacLean Moss
ATTORNEY INVENTOR
Charles MacLean Moss Patented Aug. 16, 1932

1,871,724

UNITED STATES PATENT OFFICE

CHARLES McL. MOSS, OF PITTSBURGH, PENNSYLVANIA, ASSIGNOR TO WESTINGHOUSE ELECTRIC & MANUFACTURING COMPANY, A CORPORATION OF PENNSYLVANIA

MULTIFREQUENCY CIRCUIT BREAKER CONTROL SYSTEM AND PROTECTIVE SYSTEM

Application filed March 3, 1928. Serial No. 258,894.

This invention relates to protective systems, circuit-breaker control systems for power systems, and more particularly to systems utilizing a plurality of auxiliary control sources having frequencies different from each other and different from the frequency of the main source of power.

Objects

The principal objects of this invention are as follows:

To provide a system of automatic protection for power lines, which protection shall be responsive to multi-frequency auxiliary sources of power.

To provide a protective system controlled by a plurality of auxiliary sources of power each of a definite frequency different from any other adjacent source of power, and different from the frequency of the main power system.

To provide a protective system utilizing auxiliary sources of control power normally out-of-phase.

To provide a protective system such that a faulty conductor shall be automatically isolated when a fault occurs thereon and automatically reconnected when such fault is removed.

To provide a protective system which shall differentiate between a fault condition and a load condition although the minimum short-circuit, or fault current, may be of less value than the maximum load current.

To provide a protective system, the settings and adjustments of which shall be independent of the number of main units of power supplying the main power to the system.

To provide a protective system which shall not appreciably affect the voltage regulation of the protected power system.

To provide a protective system which shall produce a minimum interference in neighboring signalling, safety or communication equipments or circuits.

To provide a protective system which shall be dependent upon circuit conditions and independent of load conditions such as load-current demand.

To provide a protective system in which there shall be no sequential operation of circuit breakers unless such sequential operation is desired for reasons other than to secure selectivity between faulty and clear line-sections.

The general principle of operation of this protective system relates to the utilization of multi-frequency auxiliary sources of power superimposed upon the main power system, for the purpose of measuring the impedance of circuits closed by a connection between a power line and its return path, the circuit of minimum impedance being utilized to control the circuit interrupters which isolate only the faulty line. In one modification, the auxiliary sources of special frequency are isolated to each conductor, and the circuit breaker actuating relays, associated with that particular conductor, are made responsive to the variations in impedances of the circuits closed by a fault connection between that particular conductor and its return path. In another modification of this protective system, the multi-frequency sources of auxiliary power are superimposed upon the entire main power system as a whole, and the circuits closed by a fault connection are again utilized to actuate the circuit interrupter actuating relays, the circuits of minimum impedance being used as a means of differentiating between the good and the faulty conductors. If the main power system in the latter case has lines or conductors in parallel connection, means are provided in such lines to distribute the multi-frequency currents between the various conductors, whereby only the relays in the faulty conductor differentiate between such distribution of currents, and control only the circuit breakers in the faulty line.

Heretofore, in many of the control systems utilizing superimposed high-frequency currents, or control currents of frequency different from that of the main source of power, it has been necessary that such auxiliary sources, operating at a single definite frequency, be running in phase opposition, in order to prevent a circulating current which might give false operation of the power system circuit breakers. One of the outstanding advantages, therefore, of the present system is that there is no necessity of synchronizing the auxiliary sources of control power, because no circulating currents can flow between such sources whether they are in phase opposition or not, and further, that a failure of any of the auxiliary sources of power supply will not cause false operation of the circuit breakers in the main power system responsive to unbalanced control voltages.

In the drawings:

Fig. 4 is a diagram illustrating the protective system applied specifically to a three-phase power system.

Fig. 5 is a diagram illustrating the single phase auxiliary sources of power superimposed upon a three-phase network.

*Description of construction*

Figure 1:
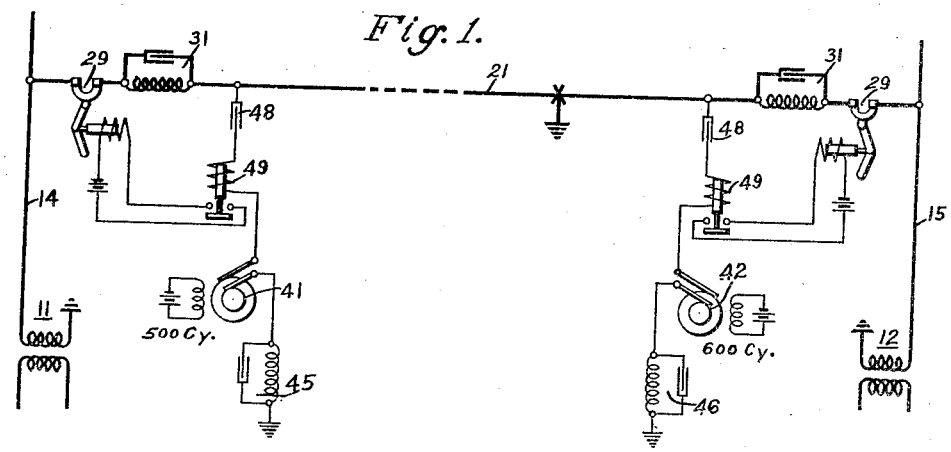
Figure 1 is a line diagram illustrating a multi-frequency circuit breaker control system in one of its modifications.
Figure 3:
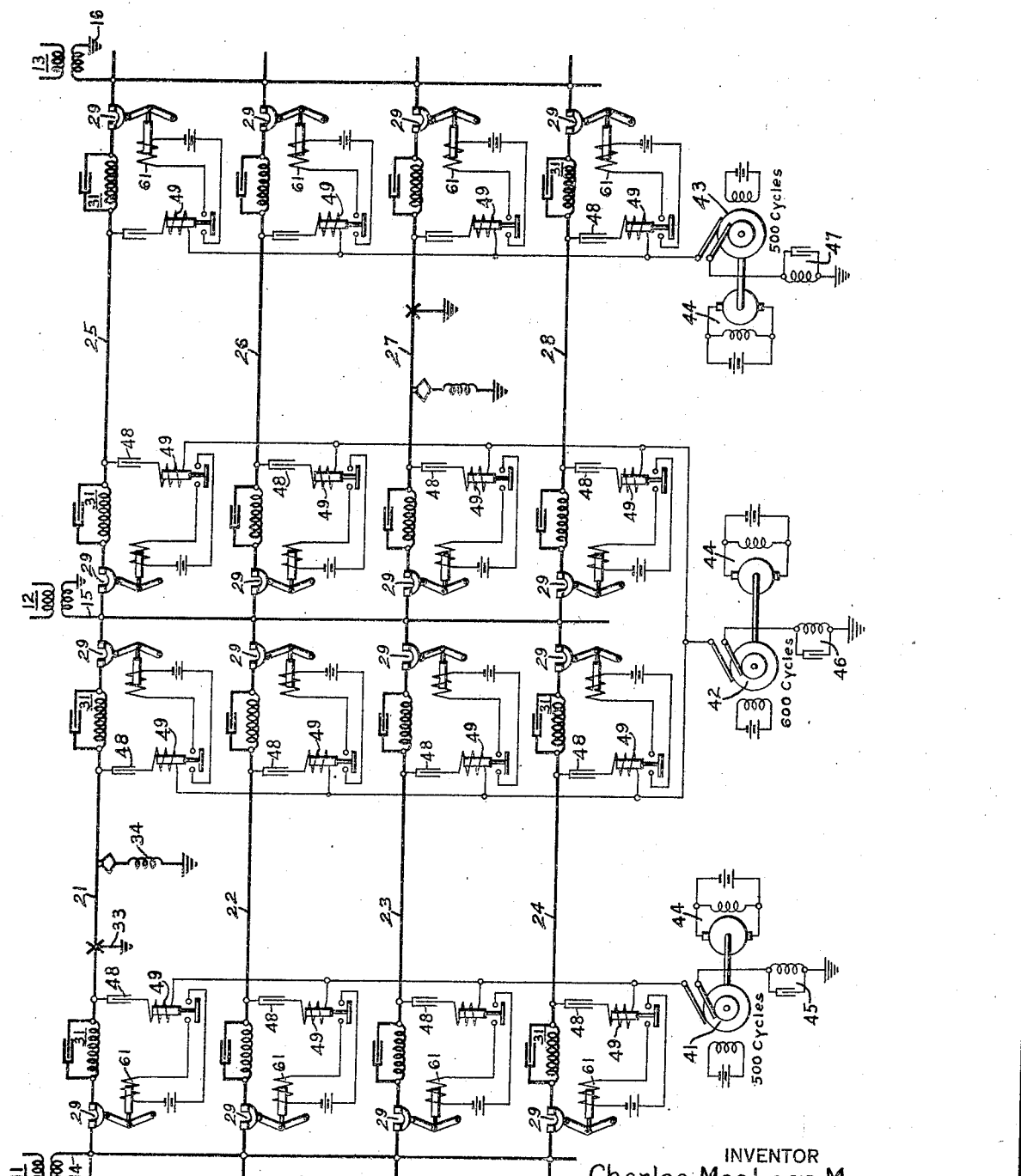
Fig. 3 is a line diagram illustrating the protective system applied to any type of power system having lines in parallel and having a plurality of substations.

The multi-frequency circuit-breaker control system and protective system may be applied to any type of power system whatever, but it will now be described with reference to a single-phase power system having a plurality of substations connnected by conductors in parallel, as illustrated in its simplest elements in Fig. 1 and more in detail in Fig. 3. Fig. 3 may be considered as a single-phase railway system, for example, but, obviously, may also be considered as a line diagram for any type of power system.

Referring to Fig. 3, power is fed from the substations 11, 12 and 13 at a normal frequency, say, 25 cycles or 60 cycles, through the feed-in conductors 14, 15 and 16, to the main power conductors 21 to 28, inclusive. Two sections only of the power system are shown, that is, sections 11—12 and 12—13, although, in practice, other sections may be adjacent thereto, or associated therewith. Each of the main conductors 21 to 28, inclusive, is provided with circuit interrupters or circuit breakers 29, located near the ends thereof. Each of the circuit breakers is provided with a trip coil 61, and is arranged to be actuated by suitable actuating mechanism upon the operation of its associated actuating relay 49.

In each of the substations, an auxiliary source of power such as 41, 42 and 43 is provided, illustrated as sources at frequencies of 500, 600 and 500 cycles, respectively, whereby alternately different frequencies are provided in the substation supplying any particular section, such as sections 11—12 to 12—13. The frequencies of 500 cycles and 600 cycles are nominal, being specified merely to illustrate a practical embodiment of these control frequencies. The requirement of this protective system is merely that they be of different periodicity when applied to the ends or along the ends of any section of the main power system. The auxiliary sources of power may be generators, oscillatory tubes, or any other sources of constant potential, although herein they are illustrated by the generators 41, 42 and 43 which are driven by the motors 44, individually. The motors 44 are shown as direct current motors, preferably energized by a storage battery, whereby the protective system is independent of the main line current, or failure of the main line current. However, the prime movers 44 may be driven by energy from the main line current, or from any other type of prime mover having suitable characteristics.

In the particular form shown in Fig. 3, the auxiliary sources 41, 42 and 43 are applied, or coupled, to the main line conductors 21 to 28, inclusive, individually through a coupling device 48. In the high-frequency feed-in circuits, there are also provided blocking devices 45, 46 and 47, which function to prevent circulating currents between the auxiliary sources. These devices 48 and 45 will be described as follows:

The devices 48 are coupling devices which are connected between the superimposed auxiliary sources and the main line conductors 21 to 28, inclusive. Each device may comprise a condenser of such characteristics that it will obstruct or block currents of the load frequency, say of 25 cycles in the present instance, from the auxiliary circuits, and at the same time permit the passage of currents from the auxiliary source at the auxiliary source frequency of 500 or 600 cycles, as the case may be, depending upon the particular source of auxiliary frequency with which the coupling device 48 is associated. The device 48 must, therefore, have a relatively very high impedance to 25 cycle main source currents, and a relatively very low impedance to currents at 500 cycles in the stations 11 and 13, or at 600 cycles in the station 12.

In series with the respective coupling condensers 48 and the respective auxiliary high-frequency sources are relays 49, or other means responsive to the auxiliary-source currents, for controlling the associated circuit interrupter 29. They may be ordinary overcurrent relays, or more complicated relays having pre-setting devices, or may be tube devices or any other means responsive to auxiliary currents for controlling the circuit breakers 29.

The blocking device 45 is installed, preferably, in that side of the auxiliary source 41 which is nearest, electrically, to the other auxiliary sources of power 42 and 43. The purpose of this blocking device 45 is to prevent current from the 600 cycle source of power, such as source 42, from flowing in the circuit in which the device 45 is located. Similarly, the purpose of the blocking device 46 is to prevent currents at 500 cycles from flowing in the circuit in which the blocking device 46 is connected. In other words, the devices 45 and 46 are means for preventing the circulation of currents between the auxiliary sources of power 41 and 42. The device 45 must, therefore, have a relatively high impedance at 600 cycles and a relatively low impedance at 500 cycles.

Conversely, the device 46 must have a relatively high impedance at 500 cycles and a relatively low impedance at 600 cycles.

It may be observed that the devices 45 and 46 prevent circulation of currents between the generators 41 and 42; that the devices 46 and 47 prevent circulation of currents between the generators 42 and 43; and that the circulation of currents between the generators 41 and 43 is prevented by other devices 31 as subsequently described. Obviously, this system can be extended to an indefinite number of stations by alternating the frequencies of the auxiliary sources of power.

Figure 2:
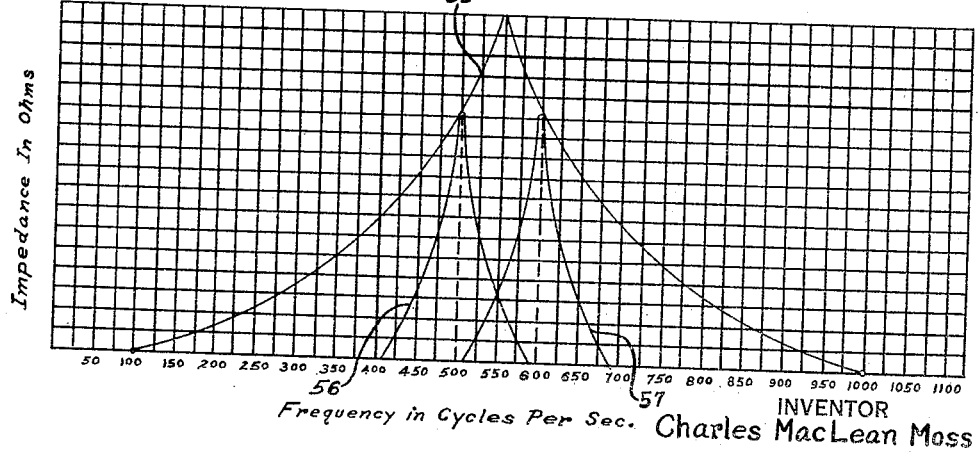
Fig. 2 is a chart illustrating typical characteristic impedance-frequency curves of the tuned impedance devices utilized in this protective system.

The devices 31, as hereinafter described, comprise reactors and condensers in parallel, as illustrated. They are intended, however, merely as impedance devices for the purposes outlined. If the preferred form of reactors and condensers in the parallel circuit relation are used, they must be tuned by adjustment to obstruct the auxiliary relaying currents of 500 cycles and 600 cycles. In Fig. 2 are illustrated typical characteristic curves of these devices when tuned to their respective operating frequencies.

Referring to Fig. 2, the curve 56 is a typical characteristic curve of a blocking anti-resonant, or tuned impedance device, such as the device 46 in Fig. 3, having a relatively high impedance at 500 cycles and a relatively low impedance at 600 cycles. The device 46 should be tuned to obstruct or block 500 cycle current, as illustrated in curve 56.

Similarly, the curve 57 illustrates the impendance-frequency characteristic curve of a device such as the tuned impedance device 45 having a relatively high impedance at 600 cycles and a relatively low impedance at 500 cycles. The device 45, in its preferred form, should, therefore, be tuned to block currents of 600 cycles, as is illustrated by the curve 57.

Installed in each of the main line conductors 21 to 28, inclusive, are the devices 31, which are placed near the ends of each conductor and the purpose of which is to exclude auxiliary currents from all other main power lines. In other words, they must obstruct or block currents of both 500 cycles and 600 cycles and consequently must provide a relatively high impedance to the passage of all the auxiliary source currents. In their preferred form, as illustrated in Fig. 3, they comprise a reactor and a condenser in parallel, tuned to obstruct currents of 500 cycles from the source 41, and of 600 cycles from the auxiliary source 42. A typical characteristic impedance-frequency curve of such a device 31 may be as illustrated by the curve 55 in Fig. 2 which shows a device 31 tuned to have a relatively high impedance at both 500 and 600 cycles.

It should be noted that one source of auxiliary power, such as the devices 41, 42 and 43, and one tuned impedance device, such as devices 45, 46 and 47, are sufficient for each substation.

Description of operation

Referring to Fig. 3, under normal conditions of operation, the power conductors 21 to 28, inclusive, are energized by the main-source currents from their main sources 11, 12 and 13. All of the circuit interrupters 29 are in closed position. The auxiliary sources 41, 42 and 43, etc. are operating at their proper frequencies, generating a voltage but supplying no appreciable current, because any circulating currents that would tend to flow are obstructed or blocked by the tuned impedance devices 45, 46, 47 and 31. If such tuned impedance devices were not employed, circulating currents would obviously flow between the sources 41, 42 and 43 and would cause actuation of the operating relays 49. Normally, however, substantially no such circulating currents can flow.

If, however, a fault occurs, such as the fault 33 in connection with the conductor 21, two paths for the flow of the auxiliary currents are established. Such paths would be as follows: from the auxiliary source 41, through the impedance device 45, through the fault connection 33, the conductor 21, the coupling device 48, the relay 49 and back to the auxiliary source 41, thus constituting a closed circuit.

Another such closed circuit is formed in connection with the auxiliary source 42, at the substation 12, the fault connection 33 closing the circuits in both cases. The auxiliary current flowing as a result of the fault connection closing the circuit, is utilized to actuate the relays 49 associated with the conductor 21, and to interrupt the line at both of its ends by actuation of the circuit interrupters 29 in the line 21 only. No other lines adjacent to the line 21 or otherwise disposed will be affected because, as indicated by tracing the circuits as above, only that line which is faulty is isolated. Further, this system provides a means of obtaining selectivity between the parallel conductors 21 to 24, inclusive, because the circulating currents set up by the fault connection 33 actuate only the relays 49 associated with the line 21, and because there are no circulating currents connected with the actuating relays of the non-faulty lines 22 to 24, inclusive, which would tend to cause them to operate. This system is, therefore, perfectly selective between the parallel connected conductors so as to isolate only the faulty conductor 21 and leave undisturbed the non-faulty or good conductors 22, 23 and 24, etc.

Similarly, the non-faulty conductors in the adjacent sections, such as, say, the conductors 25 to 28, are likewise undisturbed, the reason being that the circulating control currents connected with the faulty conductor 21 are isolated therein by means of the impedance devices 31 at both ends of line 21. Consequently, no circulating currents from line 21 can pass into the actuating relays connected with the non-faulty conductors to cause false operation of circuit breakers in the non-faulty lines.

Inasmuch as the fault connection 33 serves to establish the closed circuit to both the auxiliary sources 41 and 42 at the same time, the relays in both of such circuits are actuated simultaneously and therefore the faulty conductor 21 is isolated at both its ends simultaneously, which is a very desirable condition since undue disturbances by induction in neighboring safety, signalling, or communication circuits is thereby avoided.

If a tap load connection, such as 34, is applied to conductor 21, the auxiliary circuits heretofore mentioned are closed and a certain amount of auxiliary current will flow. Such currents, however, will be insufficient in amount to actuate the relays to cause false operation of the circuit interrupters 29 in line 21, because the tap load connection will have ordinarily a relatively very high impedance to the passage of current at 500 or 600 cycles. On the other hand, a fault connection, such as 33, will have a relatively very low impedance to the passage of such currents. Therefore, this protective system will discriminate or differentiate between a load condition and a fault condition, although the maximum load current may be of a greater magnitude than the minimum fault current. A greater degree of differentiation between load currents and fault currents may be obtained by additional devices, but the system in its simplest form will operate as described.

One means of obtaining a greater degree of differentiation between the load currents and the fault currents is described later in this specification as part of this protective system.

It should be noted that this protective system is responsive to circuit conditions, rather than to load conditions, that is to say, it depends upon the impedance of a fault connection to the passage of auxiliary current and is independent of load current. The general principle of this particular variation of the invention is the application, to the individual conductors of a power system, of auxiliary sources of power of frequencies different from each other and different from that of the main power system, to isolate the superposed auxiliary current to individual conductors, and to utilize them to measure the impedance of a fault connection. The fault connections effect the completion of the circuits to the auxiliary sources, and the currents in such circuits are utilized to actuate relays for controlling the circuit breakers of the line to be protected or controlled.

*Application to a three-phase power system*

In Fig. 4, the protective system is illustrated as applied specifically to a three-phase power system fed from the main sources 11 and 12, and having parallel connected lines 21a and 22a, lines 21b and 22b, and lines 21c and 22c connected, respectively, in parallel circuit relation. In each of the main lines, circuit interrupters 29 and anti-resonant impedance devices 31 are provided, as heretofore described. Similarly, the auxiliary sources are applied to the individual conductors through circuits comprising the coupling devices 48, the circuit interrupter actuating relays 49 and the impedance devices 45 and 46, all as hereinbefore described. In the three-phase application, however, the auxiliary sources are preferably three-phase sources, as illustrated by the grounded-neutral Y-connected three-phase generators 75 and 76, at frequencies of 500 and 600 cycles, respectively. Each source may be, however, a single phase source such as the source 80, Fig. 5, but when the single phase source 80 is used, it is necessary to use insulating transformers 77, 78 and 79 in order to provide for the difference in potential of the main line conductors and also to provide a difference of potential of the several auxiliary-source voltages in the different phases, in order to isolate a faulty conductor or line upon the occurrence of a phase-to-phase fault in a three-phase transmission line. Of course, with grounded high-frequency sources, the relays 49 would respond to line-to-ground faults, whether the high-frequency voltages in the different phases were different or not.

The principle involved is merely the provision of a difference in potential which may be secured either by a difference in phase, which may be obtained from the polyphase auxiliary source 75, or a difference in magnitude, which may be obtained from the single-phase auxiliary source 80. The operation of this application of the protective system to a three-phase power system, with the exception of the differences pointed out herein, is identical with that already described in connection with Fig. 3.

Method of and means for providing "lock-out"

Figure 6:
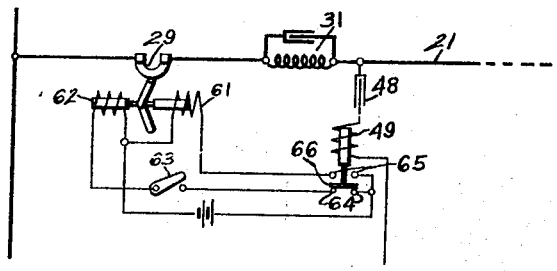
Fig. 6 is a diagram showing the method of and means for providing a circuit-breaker lock-out during the persistence of a fault.

In Fig. 6, there is illustrated a method of and a means for providing a circuit-interrupter "lock-out" during the persistence of a fault. The object involved is to interrupt the circuit of the circuit breaker closing coil during the persistence of the fault, so that the circuit breaker cannot be reclosed during the persistence of the fault, but will automatically reclose when the fault is removed. With particular reference to Fig. 6, when a fault occurs in connection with the line 21, the operating coil 49 of the relay closes the contacts 65 which complete the circuit of the trip coil 61, of the circuit interrupter 29, and at the same time it opens the contacts 64 which break the circuit of the closing coil 62 of the breaker 29. As long as the fault persists, the operating coil 49 is energized and continues to retain the movable relay-contact member 66 away from the contacts 64, but as soon as the fault condition is removed, the movable member 66 closes the contacts 64 and, provided that the switch 63, which may or may not be employed, is closed, energizes the coil 62 which automatically recloses the breaker upon the removal of a fault condition. This system will, therefore, provide for the automatic reclosing of the circuit breakers. Essentially the same scheme can be employed to prevent an operator from closing the interrupter 29, as the relay 49 may be arranged either to interrupt the closing circuit or to actuate a mechanical interference lock, to prevent closing the interrupter 29 so long as the fault persists.

Figure 7:
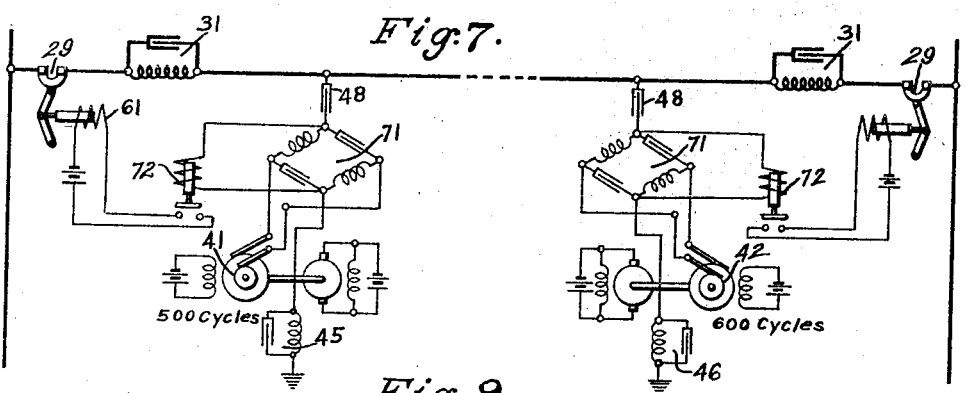
Fig. 7 is a diagram illustrating a multi-frequency control system utilizing a constant high-frequency control current, and having under-voltage means for actuating the circuit interrupters, as distinguished from the preferred method of a constant-potential system utilizing an overcurrent means for actuating the circuit interrupters.

Application using constant current system and over-voltage means for actuating the circuit interrupters Fig. 7 is a diagram illustrating the application of the protective system utilizing a constant-current auxiliary source instead of the constant-potential source heretofore described. The system is identical, except that the constant-potential source 41 is arranged, by means of a constant-current device such as the mono-cyclic square 71, to furnish a constant current in the auxiliary circuits. The relay 72 is then made responsive to a drop in voltage which will occur upon the occurrence of a fault condition. The system is otherwise the same as heretofore described, although the preferred form is a constant-potential system.

Figure 8:
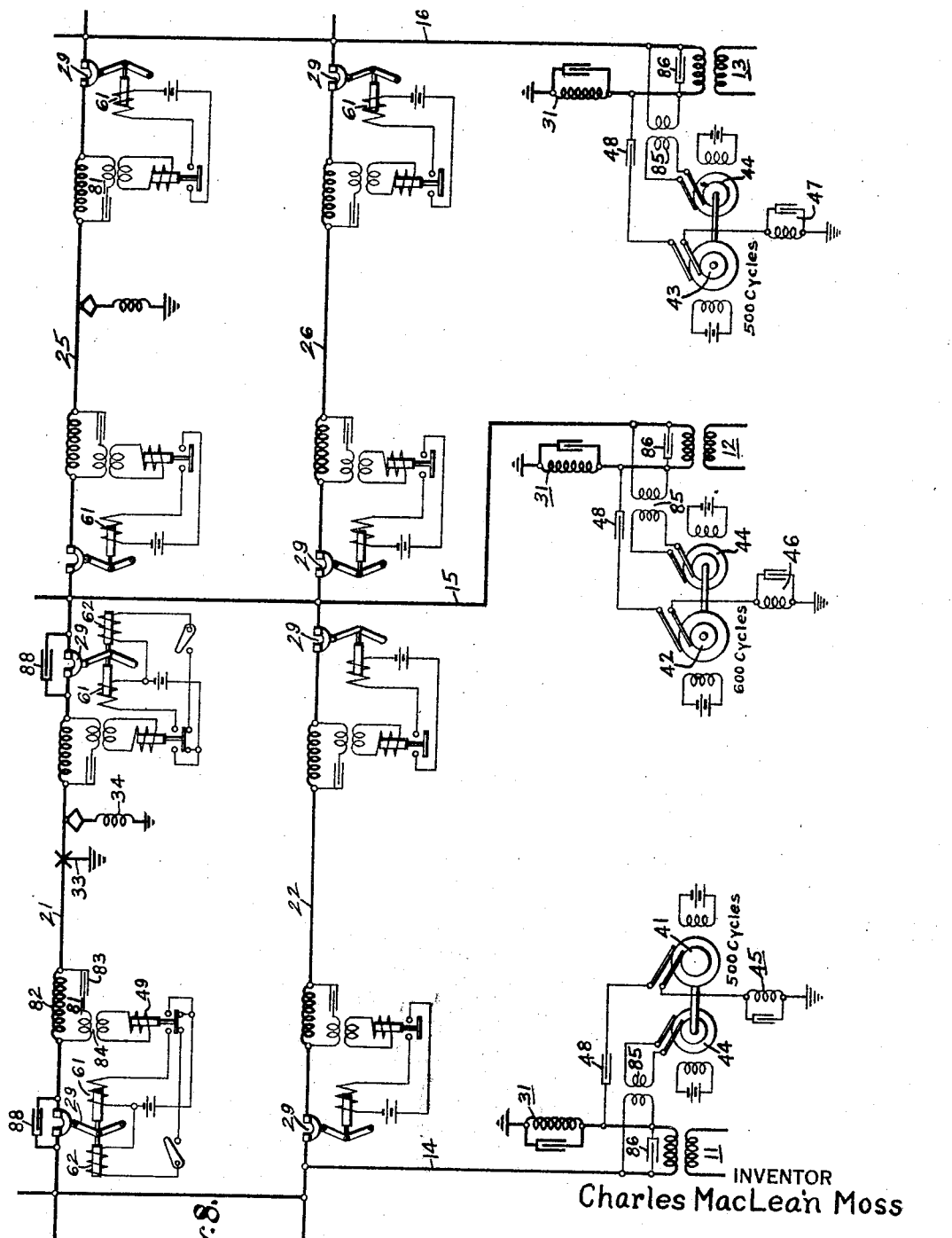
Fig. 8 is a diagram illustrating a protective system as applied to a power network as a whole, as distinguished from superimposing the special frequency control currents upon the individual power conductors.

The multi-frequency circuit-breaker control system applied to a network as a whole Another modification of this invention differentiates from the modifications heretofore described in that, instead of the control currents being applied to the individual wires or conductors, they are applied to the power system network as a whole, as is illustrated in Fig. 8.

As before, the main sources of power 11, 12, and 13 are fed to the conductors 21, 22, 25 and 26 which are equipped with circuit interrupters 29, having actuating means therefor including trip coils 61 and the actuating relays 49. The auxiliary sources of power 41, 42 and 43, however, are not applied to the individual conductors, but are applied to the feed-in circuits 14, 15 and 16, or, in other words, to the power system as a whole, and preferably on the ground side of the main transformers 11, 12 and 13, in order to avoid the necessity of high insulation to that portion of the apparatus connected thereto. The object of this variation of the invention is to apply the multi-frequency auxiliary sources to the power network as a whole, and to utilize such sources to measure the impedance of the circuits closed by a fault connection, in such a manner that circuits of minimum impedance are arranged to control the isolating device or circuit interrupter in the faulty conductor to be protected.

Description of construction

In this modification of the invention, the main sources of power 11, 12 and 13, the feed-in conductors 14, 15 and 16, the line conductors 21, 22, 25 and 26, the circuit interrupters 29, the trip coil 61, the actuating relays 49, all have the same purposes as hereinbefore described. Likewise, the auxiliary sources 41, 42 and 43, together with their prime movers have the same significance as hereinbefore described. The prime movers 44 on this diagram, Fig. 8, are illustrated as being energized from the main sources of supply 11, 12 and 13, by means of the transformers 85.

The impedance devices 31 are, as before, devices providing relatively very high impedance to the passage of 600 cycle and 500 cycle currents, but at the same time, passing current at load or normal frequency of 25 cycles. In this variation, however, they are connected between the high frequency feed-in circuits and ground, rather than in the individual line conductors 21 to 28, inclusive, as before described in connection with Fig. 3. Their purpose is to block or obstruct the passage of the auxiliary-source currents so that such currents will be directed to the main conductors 21, 22, 25 and 26 instead of forming a short-circuiting path to the terminals of each auxiliary source individually as would be the case if such blocking devices 31 were not employed.

The devices 45, 46 and 47 are, as before described, means for preventing the circulation of currents between the auxiliary sources 41, 42 and 43.

The coupling devices 48 are placed in the auxiliary-source supply circuits and constitute means for preventing load frequency currents from entering the superimposed auxiliary circuits and associated sources of power 41, 42 and 43. In the preferred form, the devices 48 are condensers arranged to obstruct currents of main-source frequency, and to pass freely currents of auxiliary-source frequencies. The coupling devices 48, however, in this particular embodiment, wherein the superimposed currents are applied at the ground side of the power system, are not always essential although they may be required under certain conditions.

I preferably by-pass each of the high-tension windings of the power condensers 11, 12 and 13 by means of a condenser or capacitor 86, which, although not absolutely essential, constitutes a low-impedance by-pass to the passage of currents of frequencies of the auxiliary sources, and would be particularly useful in cases where the main transformers 11, 12 and 13 are of relatively high impedance to the passage of currents of frequencies of the auxiliary sources. In its preferred form, it is a condenser arranged to obstruct currents of main source frequency, and to pass freely currents of the frequencies of the auxiliary sources. However, if the impedances of the main transformers 11, 12 and 13 offer a relatively too high impedance to the passage of the superimposed currents, the latter may be applied through a device such as the device 48, to the high tension sides of the power transformers 11, 12 and 13 instead of to the ground side as illustrated (Fig. 8).

The by-pass condensers 86 and the anti-resonant devices 31 may, in such a case, be omitted.

I also provide each end of each of the lines 21, 22, 25 and 26 with a parallel-resonant device 81, which, although similar in appearance to the device 31, is different. The device 31 is a blocking device whereas the device 81 is merely a means for providing a high impedance to the passage of currents at frequencies of the auxiliary sources without substantially blocking them. In its preferred form, it comprises a reactor 82 and a condenser 83 in parallel circuit relation and tuned to oppose the passage of currents at 500 cycles and at 600 cycles, although not to obstruct them entirely. In other words, it is a high-frequency impedance. Its purpose is to distribute the currents of the frequencies of the auxiliary sources between the faulty and the non-faulty parallel conductors in such a manner as to provide a difference in the distribution of currents between the faulty and non-faulty conductors so that the relay may be responsive to such differentiation in distribution of the auxiliary currents; that is to say, the auxiliary currents passing from the main source 11 to a fault connection 33 in the line 21 may pass through either of the lines 21 or 22. Such auxiliary-source currents as flow to the fault 33 through the line 21 must pass through only one impedance device 81, whereas the currents flowing to the same fault through the line 22 must pass through three such impedance devices 81 in series. Such a difference in the impedance paths provides a means for differentiating between the good and the faulty parallel conductors. Obviously, therefore, if there are no parallel-connected conductors in the power system, the provision of means for distributing currents between parallel conductors is unnecessary.

The device 81 also serves another purpose. The condenser 83 in one path thereof serves to obstruct the passage of currents at load frequency of 25 cycles and to prevent such 25 cycle currents from being transformed through the transformer 84 into the relay 49.

*Description of operation*

Under normal conditions of operation, the power conductors 21, 22, 25 and 26 are energized from the main sources 11, 12 and 13. The circuit breakers 29 are closed. The auxiliary sources 41, 42 and 43 furnish constant potential at their respective frequencies, superposed upon the main conductors, but normally substantially no circulating currents can flow between the sources 41, 42 and 43, by reason of the devices 45, 46, 47, 31 and 81, placed in their circuits.

When a fault condition or short circuit, such as the fault 33, occurs on the line 21, the fault closes the auxiliary circuits associated with the sources 41 and 42, thereby setting up a flow of auxiliary currents which serve to actuate the relays 49 at both ends of the line 21 and to interrupt the line 21 simultaneously at both ends. The non-faulty conductor 22 is not interrupted because the major portion of such auxiliary currents will flow only in the line 21 and not in line 22, by reason of the impedance devices 81, which constitute means for distributing the maximum auxiliary current into the faulty conductor 21. For the same reason, currents of a magnitude too small to operate relays 49 at the auxiliary frequencies, will flow in the other non-faulty conductors, whether parallel or adjacent, or in any location whatever, and consequently, only the faulty conductor 21 will be isolated, all the other conductors which are non-faulty remaining undisturbed. The protective system is therefore selective so as to isolate only the faulty conductor and the isolation is accomplished by interrupting the connections of the conductor to the rest of the power system simultaneously at both ends of the faulty conductor.

A tap-load connection 34 will, of course, cause a certain amount of the auxiliary current to flow and tend to improperly interrupt the line, but such currents will be of a relatively small magnitude because the tap-load connection will provide a relatively high impedance to the passage of the currents of the frequencies of the auxiliary sources. The differentiation between the impedances of the tap load 34 and of the fault connection 33 to the superposed frequencies, provides a means of differentiating between a load condition and a fault condition and the relays 49 are adjusted to be responsive to such differentiation. This protective system will, therefore, discriminate between a load condition and a fault condition.

It may be desirable in some cases to provide for automatic reclosing of the circuit breakers in a faulty line after the fault condition has passed. In such a case, the circuit breakers 29, as shown in Fig. 8, may be equipped with a means for providing circuit breaker "lockout" during the persistence of a fault and for automatic reclosing of the circuit breakers after the fault condition has been cleared. Such means have been described and shown in connection with Fig. 6, but are shown associated with only one set of the circuit breakers of Fig. 8, as an example. There is, however, one additional feature required when the method of automatic reclosing of circuit breakers is applied to this modification of the protective system. The circuit-breaker contacts must be shunted by a high-frequency by-pass circuit 88 in order to maintain the energization of the relay 49, thus retaining it in the upper or tripping or lock-out position. For example, when the line 21 is segregated from the rest of the system, the means utilized may be a condenser 88 arranged to pass freely currents of superposed frequencies, but to obstruct or block currents of the main source frequency.

Figure 9:
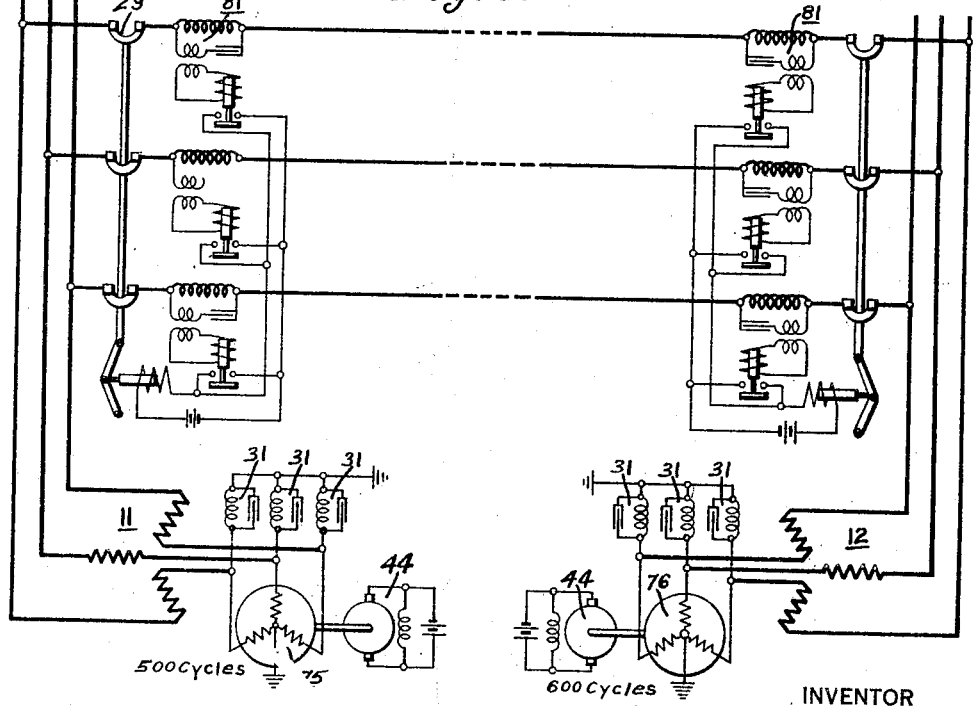
Fig. 9 is a diagram, similar to Fig. 8, illustrating the protective system applied specifically to a three-phase power network as a whole.

Fig. 9 is a diagram illustrating this protective system applied to a three-phase power system network, specifically. The construction and operation are identical with that already described in connection with Fig. 8 and previous figures, except that the main sources of power 11 and 12 have their neutral terminals arranged to connect to the impedance devices 31 and the auxiliary source of power 75 is preferably a three-phase generator having a grounded neutral connection. In other particulars, the description of construction and operation is identical.

Tap-load connections

Figure 10:
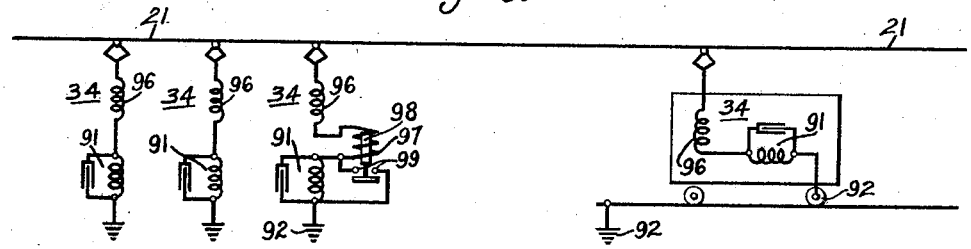
Fig. 10 is a diagram illustrating one form of a tap load connection between stations.
Figure 11:
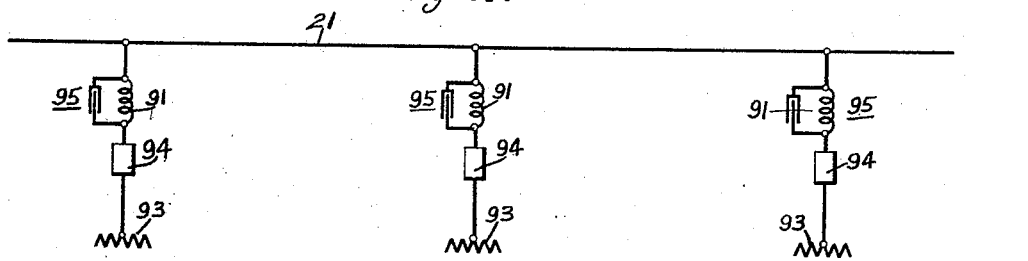
Fig. 11 is a diagram illustrating another form of a tap load connection.
Figure 12:
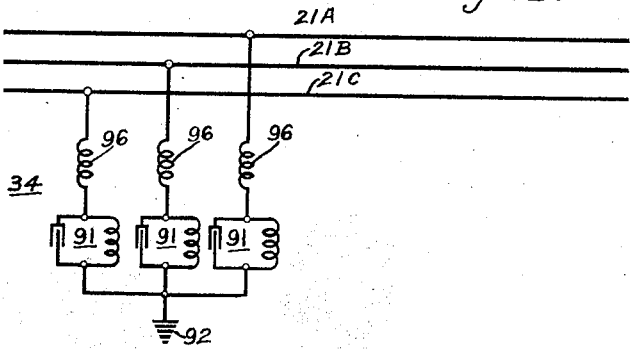
Fig. 12 is a diagram illustrating a three-phase equivalent of the tap load connection.

It has been explained hereinbefore how a tap-load connection between the stations of the power system causes a certain amount of the auxiliary currents to flow in the control circuits closed thereby and, consequently, has a tendency to cause false operation of the circuit interrupters, a condition which is undesirable. A few units of such tap-load connections 34 will not produce false operation of the circuit breakers 29, but when a sufficient number are added, a point is finally reached when the impedance to the superposed control currents is so reduced by these additional load units in parallel circuit relation, that false operation of the circuit interrupters might result. In Figs. 10, 11 and 12 are illustrated a means for overcoming this difficulty.

In Fig. 10 is shown one form of tap-load connections 34, which may be locomotives or other motored equipment, connected between the line 21 and the return path to the main source of power. In circuit with each of the tap load connections 34 is a parallel-resonant device 91, arranged to pass freely the currents from the main source of power, but to obstruct or block currents of the superimposed frequency or frequencies. In its preferred form, the device 91 comprises a reactor and a condenser connected in parallel-circuit relation with each other and connected in series with the tap-load connections 34. The parallel-resonant device 91 is tuned to obstruct currents of the superimposed frequencies, which, in the present embodiment, are 500 and 600 cycles. It constitutes, therefore, a relatively inexpensive method for providing a relatively high impedance to the currents of the superimposed frequency or frequencies, and at the same time, a relatively low impedance to currents of normal frequency of the order of 25 cycles. The device 91 is preferably located as shown connected next to the ground terminal 92 in order that a minimum amount of insulation is required, and in order to protect the equipment 96 against a ground fault condition occurring therein.

Since the tuned impedance device 91 is arranged to obstruct currents of the superimposed frequencies, as many load units 34 may be connected to the line 21 as are desired without causing false operation of the circuit breakers 29. The system will, therefore, discriminate between load conditions and between fault conditions, which may occur either in line 21 or in the equipment 96, although the load current may exceed the fault current in magnitude. In other words, this protective system will be responsive only to a fault condition in the circuit and will be independent of the effects of load conditions.

Obviously, the protective system illustrated in Fig. 10 which relates to a ground fault condition on a single phase power system, may be extended to a polyphase power system as is illustrated in Fig. 12, which is the three-phase equivalent of Fig. 10, and which shows the protective system for tap loads applied to ground faults and to phase faults also. Fig. 12 may be combined, for example, with Figs. 4 and 9, and may be treated as a part of such or similar systems, although, of course, it is not limited to the multi-frequency superimposed systems, but may be applied to any superimposed frequency system.

In Fig. 11 is shown another form of a tap-load connection 95, which may be utilized in connection with taking loads between the stations in any type of power system, wherein the line is represented by the line 21 and the load by the device 93. Such tap loads 95 may be taken at various points along the line 21 between stations.

The device 91, as before described, comprises a means for obstructing the superimposed currents but for passing or filtering freely the load currents from the main source of power. The purpose of the device is to prevent faults in the tap-load stations 95 from affecting the circuit breakers 29 of the main line 21, or, in other words, to isolate tap-load station faults to the individual stations 95.

The device 94 is a means, such as an overcurrent relay or other conventional apparatus, responsive to the local trouble in the tap-load station 95 only, for interrupting the load current flowing to the load 93.

Under normal conditions of operation, the load currents are supplied from the line 21 to the load 93 of the various tap-load connections 95. The tap-load connections 95 at the same time tend to form a closed circuit for the superimposed control currents but such currents are substantially blocked by the devices 91 which are in series with the superimposed circuits. The tap-load connections 95, therefore, have no appreciable tendency to give false operation of the circuit interrupters 29, no matter how many loads 95 there may be connected to the line 21.

In the absence of the device 91, if a short circuit or other fault condition should occur in a tap load 95, a path of low impedance to the passage of the superimposed currents would cause the circuit breakers 29 to operate. The device 91, however, causes the superimposed currents that would otherwise flow to be blocked and, consequently, a fault condition in the tap-load station 95 has no effect in isolating the line 21. Such local faults may be isolated by means of the device 94 without disturbing the remainder of the power system.

It should be observed that the device 91 may be utilized with any protective system whatever having a superimposed source of control currents.

As indicated in Fig. 11, by placing the blocking device 91 between the load equipment 93 and the source of power supply from line 21, the operation of the superimposed system of protection is prevented from being responsive to faults occurring in the equipment 93. But by placing the blocking device 91 at a remote location from the supply line 21 as is illustrated in Fig. 10, the superimposed system will protect against faults occurring in the equipment 96, when the fault is in the nature of a line-to-line or a line-to-ground fault. The location of the device 91 in the tap-load connections 34 or 95, therefore, provides a means of differentiating between the faults in the load equipments 93 or 96. But in either case, the superimposed system will protect against main line faults as distinguished from tap-load equipment faults. And further, the location of the device 91 in the tap-load connections 34 or 95, therefore, provides a means for differentiating between main line faults and tap-load equipment faults. The system shown in Fig. 11 is such that the protective relays 49 will operate to clear line faults only, while the system shown in Fig. 10 is such that the protective relays 49 will operate to clear either main line faults or equipment faults. In neither case, however, will the protective relays 49 be affected by overloads or secondary short circuits unaccompanied by equipment failure.

A distinction has been made in the foregoing paragraph between two types of load-equipment faults, one involving a line-to-line or line-to-ground fault and the other a fault isolated within the tap-load equipment itself, such as a short-circuited transformer 96 in a locomotive cab, the short circuit not having a path to the line or to the ground or otherwise providing a path shunting the blocking device 91. The protective system illustrated in Fig. 10 will protect against the former type of fault but will not protect against the latter type, because, in the latter, there is no path available for the flow of the actuating control currents unless, of course, the short circuit within the equipment itself finally burns its way to ground and thus provides a path for the flow of the superimposed control currents. In other words, this scheme, as previously described, makes no provision for the protection of the locomotive and motor cars when each unit 34 is equipped with a shunt 91 tuned to the superimposed frequency. This makes it impossible for the protective system to be made operative for certain combinations of faults in the transformers of the rolling stock 34. Protection against faults of this nature would, therefore, have to be provided by some other means such as a back-up relay, or some form of interrupting device on the locomotives and cars. The use of a differential relay for protecting the car transformer for actuating the pantograph-lowering relay has been suggested, but a scheme of this kind involves the hazard of burning of the contact line 21.

The preferred way of taking care of such faults within the cab and car transformers, as shown in Fig. 10, is to connect a relay 97 (preferably of the differential type) so that it will close a contactor 97—98—99 connected across the blocking shunt 91 located on that car or locomotive 34. The differential relay 97 may be any means, responsive to overcurrent from the main source of power, for short-circuiting the blocking device 91 during the persistence of a fault in the tap-load equipment 34. Then when the blocking shunt 91 is short-circuited, the high-frequency currents will find a path to ground through the faulty transformer, and power will be removed from the trolley 21 to which the fault is connected. To facilitate finding the unit in which the fault is existing, an operation indicator or some form of alarm should be provided on each of the differential relays.

Summary

In summarizing, by my invention I have provided a protective system and circuit breaker control system constituting a means for and a method of securing the following principal advantages:

There is no necessity for synchronizing of the auxiliary sources of control power because no circulating currents can flow between such sources, whether or not they are in phase opposition.

The failure of any of the auxiliary sources of power supply will not cause false operation of the circuit breakers in the main power conductors.

The protective system is dependent upon circuit conditions, rather than upon load conditions.

The simultaneous operation of circuit interrupters in a faulty conductor is secured.

An almost perfect selectivity is secured, such that only a faulty conductor is isolated and no other conductor in the power system is disturbed.

The differentiation between load currents and fault currents is provided, although the former may exceed in magnitude the latter.

Obviously, various other modifications may be made in my invention without departing from the spirit and scope thereof, and I desire, therefore, that only such limitations shall be placed thereon as are disclosed by the prior art, and imposed by the appended claims.

I claim as my invention:

1. The combination with an electrical power system having a plurality of parallel lines, isolating devices for said lines and actuating means therefor, of auxiliary sources of control currents of different frequencies associated with the lines so that a fault in any line establishes a closed circuit for the auxiliary sources, and means individual to said lines, responsive to the control currents flowing to said fault, for controlling the isolating devices in the faulty line only.

2. The combination with a power conductor having a main source of energy connected thereto and circuit breakers for isolating the conductor, of a plurality of auxiliary sources of control current of frequencies different from each other and different from the frequency of the main source associated with the conductor, means for supplying auxiliary currents to the conductor through auxiliary circuits, means for preventing auxiliary currents from flowing between the auxiliary sources, means for excluding main-source currents from the auxiliary circuits, and means responsive to the impedances of the auxiliary circuits, when closed by a fault connection, for controlling the isolating devices.

3. The combination with a plurality of power conductors having a main source of energy connected thereto and devices for isolating the conductors, of auxiliary sources of control current of frequencies different from each other and different from the frequency of the main source associated with the conductors, means for supplying auxiliary currents to the conductors through auxiliary circuits, means for preventing auxiliary currents from circulating between the auxiliary sources comprising tuned circuits of high impedance to currents from one auxiliary source but of relatively low impedance to currents from another auxiliary source, means for excluding the main-source currents from the auxiliary circuits comprising a condenser in each auxiliary circuit, means for opposing the flow of currents from the auxiliary sources in said main conductors comprising tuned devices of substantial impedance to currents of the auxiliary-source frequencies but of low impedance to currents of the main-source frequency, and means responsive to the currents from the auxiliary sources dependent upon the impedance of a fault connection, for controlling the isolating devices.

4. The combination with a power circuit having a main source of energy connected thereto and devices for isolating the circuit, of a plurality of auxiliary circuits each including an auxiliary source of current of a frequency different from the other and different from that of the main source, means for preventing auxiliary currents from circulating between the auxiliary sources, means for excluding main-source currents from the auxiliary sources and means responsive to the flow of current from said auxiliary sources to a fault for controlling the isolating devices.

5. The combination with an electric distribution system including a main source of energy having a plurality of auxiliary circuits associated therewith, each including an auxiliary source of current of a frequency different from that of other auxiliary sources and different from that of the main source, of means for preventing the circulation of currents between the auxiliary circuits, and means responsive to the flow of auxiliary current to a fault occurring on said system for isolating the faulty portion thereof.

6. The combination with a feeder in a power system having a plurality of parallel feeders each provided with circuit interrupters for isolating said feeders, actuating means for the circuit interrupters and a main source of energy for the system, of a plurality of auxiliary sources of current of frequencies different from each other and different from that of the main source associated with said conductors, means for supplying currents from the auxiliary sources to each conductor, means for opposing the flow of the auxiliary-source currents in all conductors, means for blocking main-source currents from the auxiliary sources, means for preventing circulation of currents between the auxiliary sources and means responsive to auxiliary currents flowing as a result of a connection between any conductor and its return path for controlling the circuit interrupters to isolate said conductor only.

7. An electric power system comprising two spaced stations, circuit-interrupting means at each of said stations, a continuously operative alternating-current control-circuit generating means at each station, said two generating means having frequencies which are different from each other and from the power current, a continuously operative coupling means at each station for coupling its control-circuit generating means to the power system, means for substantially confining the control currents of both frequencies to the portion of the power system between said stations, means for substantially preventing the circulation of control-circuit currents between the two control-circuit generating means, means for substantially preventing the flow of power current in the two control-circuit generating means, and relay means responsive to control-circuit conditions associated with each of said coupling circuits for effecting the actuation of the circuit-interrupting means at that station upon the flow of control-circuit currents into a power-system fault between said two stations.

8. An electric power system comprising two spaced stations, a plurality of line-conductors between said stations, circuit-interrupting means at each of said stations, a continuously operative alternating-current control-circuit generating means at each station, said two generating means having frequencies which are different from each other and from the power current, a continuously operative coupling means at each station for coupling its control-circuit generating means to the power-line conductors and to ground, means in each power-line conductor at each of said stations for substantially confining the control currents of both frequencies to the portions of said power-line conductors between said stations, means for substantially preventing the circulation of control-circuit currents between the two control-circuit generating means, means for substantially preventing the flow of power current in the two control-circuit generating means, and relay means responsive to control-circuit conditions associated with each of said coupling circuits for effecting the actuation of the circuit-interrupting means at that station upon the flow of control-circuit currents into a power-system fault between said two stations.

9. A polyphase electric power system comprising two spaced stations, circuit-interrupting means at each of said stations, a continuously operative alternating-current control-circuit generating means at each station, said two generating means having frequencies which are different from each other and from the power current, a continuously operative coupling means at each station for causing the flow of control-circuit currents of different phase and/or magnitude through any phase-to-phase or ground faults in the different phases of said power system, means in each power-line conductor at each of said stations for substantially confining the control currents of both frequencies to the portions of said power-line conductors between said stations, means for substantially preventing the circulation of control-circuit currents between the two control-circuit generating means, means for substantially preventing the flow of power current in the two control-circuit generating means, and relay means responsive to control-circuit conditions associated with each of said coupling circuits for effecting the actuation of the circuit-interrupting means at that station upon the flow of control-circuit currents into a power-system fault between said two stations.

10. A polyphase electric power system comprising two spaced stations, circuit-interrupting means at each of said stations, a continuously operative polyphase control-circuit generating means at each station, said two generating means having frequencies which are different from each other and from the power current, a continuously operative coupling means at each station for coupling its control-circuit generating means to the power-line conductors and to ground, means in each power-line conductor at each of said stations for substantially confining the control currents of both frequencies to the portions of said power-line conductors between said stations, means for substantially preventing the circulation of control-circuit currents between the two control-circuit generating means, means for substantially preventing the flow of power current in the two control-circuit generating means, and relay means responsive to control-circuit conditions associated with each of said coupling circuits for effecting the actuation of the circuit-interrupting means at that station upon the flow of control-circuit currents into a power-system fault between said two stations.

11. An electric power system comprising two spaced stations, and also comprising a plurality of power-line conductors which are normally conductively tied together at each of said stations, characterized by circuit-interrupting means at each of said stations, a continuously operative alternating-current control-circuit generating means at each station, said two generating means having frequencies which are different from each other and from the power current, a continuously operative coupling means at each station for coupling its control-circuit generating means to all of the aforesaid power-line conductors and to ground, means for substantially confining the control currents of both frequencies to the portion of the power system between said stations, means for substantially preventing the circulation of control-circuit currents between the two control-circuit generating means, means for substantially preventing the flow of power current in the two control-circuit generating means, and relay means responsive to control-circuit conditions associated with each of said coupling circuits for effecting the actuation of the circuit-interrupting means at that station upon the flow of control-circuit currents into a power-system fault between said two stations.

12. A multi-circuit polyphase electric power system comprising two spaced stations, a plurality of polyphase lines between said stations, polyphase bussing means for normally tying said polyphase lines together at each of said stations, circuit interrupting means for the several power lines at each of said stations, a continuously operating alternating-current control-circuit generating means at each station, said two generating means having frequencies which are different from each other and from the power current, a continuously operative coupling means at each station for causing the flow of control-circuit currents of different phase and/or magnitude through any phase-to-phase or ground faults in the different phases of said power system, the control-circuit generating means at each of said stations being coupled to all of the aforesaid polyphase lines, means for substantially confining the control currents of both frequencies to the portion of each individual polyphase power line between said stations, means for substantially preventing the circulation of control-circuit currents between the two control-circuit generating means, means for substantially preventing the flow of power current in the two control-circuit generating means, and relay means responsive to control-circuit conditions associated with each of said coupling circuits for effecting the actuation of the proper circuit-interrupting means at that station upon the flow of control-circuit currents into a power-system fault between said two stations.

13. A multi-circuit polyphase electric power system comprising two spaced stations, a plurality of polyphase lines between said stations, polyphase bussing means for normally tying said polyphase lines together at each of said stations, circuit interrupting means for the several power lines at each of said stations, a continuously operating polyphase control-circuit generating means at each station, said two generating means having frequencies which are different from each other and from the power current, a continuously operative coupling means at each station for coupling its control-circuit generating means to the power-line conductors of all of said polyphase lines and to ground, means for substantially confining the control currents of both frequencies to the portion of each individual polyphase power line between said stations, means for substantially preventing the circulation of control-circuit currents between the two control-circuit generating means, means for substantially preventing the flow of power current in the two control-circuit generating means, and relay means responsive to control-circuit conditions associated with each of said coupling circuits for effecting the actuation of the proper circuit-interrupting means at that station upon the flow of control-circuit currents into a power-system fault between said two stations.

14. A multi-circuit electric power system comprising a plurality of spaced stations, a plurality of power lines between successive pairs of stations, a bussing means at each of a plurality of successive stations normally operative to connect the power lines at its station, and circuit-interrupting means in the power lines at a plurality of stations, characterized by a high-frequency control-circuit generating means at a plurality of stations, the frequency of the control-circuit generating means at any two successive stations being different, coupling means for applying the control-circuit power at each station to each of the aforesaid individual power lines coming into or going out of said station, means for substantially confining the control currents of both frequencies to the portion of each individual power line between said stations, means for substantially preventing the circulation of control-circuit currents between the two control-circuit generating means, means for substantially preventing the flow of power current in the two control-circuit generating means, and relay means responsive to control-circuit conditions associated with each of said coupling circuits for effecting the actuation of the proper circuit-interrupting means at that station upon the flow of control-circuit currents into a power-system fault between said two stations.

15. An electric power system comprising two spaced stations, circuit-interrupting means at each of said stations, a continuously operative alternating-current control-circuit generating means at each station, said two generating means having frequencies which are different from each other and from the power current, a continuously operative coupling means at each station for coupling its control-circuit generating means to the power system, means for substantially preventing the consumption of control-circuit power under normal conditions when the power lines are clear, means for substantially preventing the circulation of control-circuit currents between the two control-circuit generating means, means for substantially preventing the flow of power current in the two control-current generating means, and relay means at each of said stations for selectively responding to the altered control-circuit conditions, in the event of a fault, to trip the proper line-circuit interrupting means at that station.

16. An electric power system comprising a plurality of spaced stations connected by power lines, and line-circuit interrupting means at a plurality of stations, characterized by a high-frequency control-circuit generating means at a plurality of stations, the frequency of the control-circuit generating means at any two successive stations being different, coupling means for applying the control-circuit power at each station to all of the power lines at that station, means for substantially preventing the consumption of control-circuit power under normal conditions when the power lines are clear, and means at a plurality of stations for selectively responding to the altered control-circuit conditions, in the event of a fault, to trip the proper line-circuit interrupting means at that station.

17. A multi-circuit electric power system comprising a plurality of spaced stations, a plurality of power lines between successive pairs of stations, a bus at each of a plurality of successive stations for connecting the power lines at its station, and circuit-interrupting means in the power lines at a plurality of stations, characterized by a high-frequency control-circuit generating means at a plurality of stations, the frequency of the control-circuit generating means at any two successive stations being different, coupling means for applying the control-circuit power at each station to all of the power lines at that station, means for substantially preventing the consumption of control-circuit power under normal conditions when the power lines are clear, and means at a plurality of stations for selectively responding to the altered control-circuit conditions, in the event of a fault, to trip the proper line-circuit interrupting means at that station.

18. A multi-circuit electric power system comprising a plurality of spaced stations, a plurality of power lines between successive pairs of stations, a bus at each of a plurality of successive stations for connecting the power lines at its station, and circuit-interrupting means in the power lines at a plurality of stations, characterized by a high-frequency control-circuit generating means at a plurality of stations, the frequency of the control-circuit generating means at any two successive stations being different, coupling means for applying the control-circuit power at each station to the bus and to ground, means for substantially preventing the circulation of control-circuit currents between the two control-circuit generating means, means for substantially preventing the flow of power current in the two control-circuit generating means, impedance means in each line at each of said stations for offering an impedance to the flow of control-frequency currents in said lines, and relay means responsive to the control-circuit conditions in the respective lines for effecting the actuation of the proper circuit-interrupting means at that station upon the flow of control-circuit currents into a power-system fault between said two stations.

19. A multi-circuit electric power system comprising two spaced stations, a plurality of power lines between the said stations, a bus connecting the power lines at each station, and circuit-interrupting means at each of said stations, characterized by a continuously operative alternating-current control-circuit generating means at each station, said two generating means having frequencies which are different from each other and from the power current, a continuously operative coupling means at each station for coupling its control-circuit generating means to the bus and to ground, means for substantially preventing the circulation of control-circuit currents between the two control-circuit generating means, means for substantially preventing the flow of power current in the two control-circuit generating means, and relay means responsive to the control-circuit conditions in the respective lines for effecting the actuation of the proper circuit-interrupting means at that station upon the flow of control-circuit currents into a power-system fault between said two stations.

20. A multi-circuit alternating-current power system comprising two spaced stations, a plurality of power lines between the said stations, a bus connecting the power lines at each station, and circuit-interrupting means at each of said stations, characterized by a continuously operative high-frequency control-circuit generating means at each station, said two generating means having frequencies which are different from each other and from the power current, a continuously operative coupling means at each station for coupling its control-circuit generating means to the bus and to ground, means for substantially preventing the circulation of control-circuit currents between the two control-circuit generating means, means for substantially preventing the flow of power current in the two control-circuit generating means, impedance means in each line at each of said stations for offering an impedance to the flow of control-frequency currents in said lines, and relay means responsive to the control-circuit conditions in the respective lines for effecting the actuation of the proper circuit-interrupting means at that station upon the flow of control-circuit currents into a power-system fault between said two stations.

21. An electrical power-transmission line-section having a circuit breaker at each end, characterized by having a separate high-frequency means of different distinctive frequency associated with each of said circuit breakers for simultaneously and selectively tripping the circuit breakers at both ends of said line-section upon the occurrence of a fault therein.

In testimony whereof, I have hereunto subscribed my name this 27th day of February 1928.

CHARLES McL. MOSS.